(12) United States Patent
Matsuhira

(10) Patent No.: US 8,712,170 B2
(45) Date of Patent: Apr. 29, 2014

(54) IMAGE-PROCESSING METHOD AND PROGRAM, AND IMAGE-PROCESSING APPARATUS

(75) Inventor: Masatoshi Matsuhira, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 612 days.

(21) Appl. No.: 12/939,261

(22) Filed: Nov. 4, 2010

(65) Prior Publication Data

US 2011/0116712 A1 May 19, 2011

(30) Foreign Application Priority Data

Nov. 18, 2009 (JP) ................................ 2009-262953

(51) Int. Cl.
*G06K 9/36* (2006.01)
(52) U.S. Cl.
USPC ........................................................ 382/232
(58) Field of Classification Search
USPC ................... 382/162, 164, 167, 232, 308
See application file for complete search history.

(56) References Cited

U.S. PATENT DOCUMENTS

| | | | |
|---|---|---|---|
| 5,046,119 A | 9/1991 | Hoffert et al. | |
| 5,383,037 A | 1/1995 | Kimura et al. | |
| 5,644,406 A | 7/1997 | Harrington et al. | |
| 5,768,434 A | 6/1998 | Ran | |
| 5,818,969 A | 10/1998 | Astle | |
| 5,917,962 A | 6/1999 | Chen et al. | |
| 6,115,496 A | 9/2000 | Nguyen et al. | |
| 6,118,552 A | 9/2000 | Suzuki et al. | |
| 6,373,890 B1 | 4/2002 | Freeman | |
| 6,597,815 B1 | 7/2003 | Satoh et al. | |
| 6,628,419 B1 | 9/2003 | So et al. | |
| 6,693,721 B1 | 2/2004 | Suzuki | |
| 7,046,387 B1 | 5/2006 | Yagishita et al. | |
| 2005/0100232 A1* | 5/2005 | Sakanashi et al. | 382/238 |
| 2006/0114480 A1 | 6/2006 | Chang et al. | |
| 2006/0132855 A1 | 6/2006 | Dokuni et al. | |
| 2007/0116367 A1* | 5/2007 | Yamamoto | 382/232 |

(Continued)

FOREIGN PATENT DOCUMENTS

| | | |
|---|---|---|
| JP | H09-51441 A | 2/1997 |
| JP | H09-186866 A | 7/1997 |

(Continued)

OTHER PUBLICATIONS

JPEG JFIF, http://www.w3.org/Graphics/JPEG, Feb. 13, 1996.

*Primary Examiner* — Edward Park
(74) *Attorney, Agent, or Firm* — Nutter McClennen & Fish LLP; John J. Penny, Jr.; Michael P. Visconti, III

(57) ABSTRACT

An image-processing method for compressing image data, includes: (a) obtaining a block composed of part of or all of the image data; (b) determining whether the obtained block is color or monochrome; and (c) performing, in the case where the obtained block is determined to be color, compression processing in parallel for a predetermined number of elements of a predetermined color system, and performing, in the case where the obtained block is determined to be monochrome, the compression processing in parallel for individual areas obtained by dividing a division block containing the obtained block into a predetermined number of pieces for a single component of the predetermined color system.

7 Claims, 15 Drawing Sheets

(56) References Cited

U.S. PATENT DOCUMENTS

| | | |
|---|---|---|
| 2007/0183675 A1* | 8/2007 | Morohashi .................... 382/239 |
| 2008/0253647 A1 | 10/2008 | Cho et al. |
| 2009/0161975 A1* | 6/2009 | Asai et al. .................... 382/248 |
| 2009/0310873 A1 | 12/2009 | Asano |
| 2010/0098333 A1* | 4/2010 | Aoyagi ........................ 382/166 |
| 2011/0096985 A1 | 4/2011 | Matsuhira |

FOREIGN PATENT DOCUMENTS

| | | |
|---|---|---|
| JP | 2000-125136 A | 4/2000 |
| JP | 2000-148996 A | 5/2000 |
| JP | 2000-263856 A | 9/2000 |
| JP | 2001-145107 A | 5/2001 |
| JP | 2004-080387 A | 3/2004 |

* cited by examiner

FIG. 5

|     | DC | LOW |    | AC |     |     | HIGH |
|-----|----|----|----|----|-----|-----|-----|
| DC  | 16 | 11 | 10 | 16 | 24  | 40  | 51  | 61 |
| LOW | 12 | 12 | 14 | 19 | 26  | 58  | 60  | 55 |
|     | 14 | 13 | 16 | 24 | 40  | 57  | 69  | 56 |
|     | 14 | 17 | 22 | 29 | 51  | 87  | 80  | 62 |
| AC  | 18 | 22 | 37 | 56 | 68  | 109 | 103 | 77 |
|     | 24 | 35 | 55 | 64 | 81  | 104 | 113 | 92 |
|     | 49 | 64 | 78 | 87 | 103 | 121 | 121 | 101 |
| HIGH| 72 | 92 | 95 | 98 | 112 | 100 | 103 | 99 |

FIG. 6

|     | DC | LOW |    | AC |    |    | HIGH |
|-----|----|----|----|----|----|----|----|
| DC  | 17 | 18 | 24 | 47 | 99 | 99 | 99 | 99 |
| LOW | 18 | 21 | 26 | 66 | 99 | 99 | 99 | 99 |
|     | 24 | 26 | 56 | 99 | 99 | 99 | 99 | 99 |
|     | 47 | 66 | 99 | 99 | 99 | 99 | 99 | 99 |
| AC  | 99 | 99 | 99 | 99 | 99 | 99 | 99 | 99 |
|     | 99 | 99 | 99 | 99 | 99 | 99 | 99 | 99 |
|     | 99 | 99 | 99 | 99 | 99 | 99 | 99 | 99 |
| HIGH| 99 | 99 | 99 | 99 | 99 | 99 | 99 | 99 |

FIG. 7

| RRRR | SSSS | CODE LENGTH | HUFFMAN CODE |
|---|---|---|---|
| 0000 | 0000 | 4 | 000A |
| 0000 | 0001 | 2 | 0000 |
| 0000 | 0010 | 2 | 0001 |
| 0000 | 0011 | 3 | 0004 |
| 0000 | 0100 | 4 | 000B |
| 0000 | 0101 | 5 | 001A |
| 0000 | 0110 | 7 | 0078 |
| 0000 | 0111 | 8 | 00F8 |
| 0000 | 1000 | 10 | 03F6 |
| 0000 | 1001 | 16 | FF82 |
| 0000 | 1010 | 16 | FF83 |
| 0001 | 0001 | 4 | 000C |
| 0001 | 0010 | 5 | 001B |
| 0001 | 0011 | 7 | 0079 |
| 0001 | 0100 | 9 | 01F6 |
| 0001 | 0101 | 11 | 07F6 |
| 0001 | 0110 | 16 | FF84 |
| 0001 | 0111 | 16 | FF85 |
| 0001 | 1000 | 16 | FF86 |
| 0001 | 1001 | 16 | FF87 |
| 0001 | 1010 | 16 | FF88 |
| 0010 | 0001 | 5 | 001C |
| 0010 | 0010 | 8 | 00F9 |
| 0010 | 0011 | 10 | 03F7 |
| 0010 | 0100 | 12 | 0FF4 |
| 0010 | 0101 | 16 | FF89 |
| 0010 | 0110 | 16 | FF8A |
| 0010 | 0111 | 16 | FF8B |
| 0010 | 1000 | 16 | FF8C |
| 0010 | 1001 | 16 | FF8D |
| 0010 | 1010 | 16 | FF8E |
| 0011 | 0001 | 6 | 003A |
| 0011 | 0010 | 9 | 01F7 |
| 0011 | 0011 | 12 | 0FF5 |
| 0011 | 0100 | 16 | FF8F |
| 0011 | 0101 | 16 | FF90 |
| 0011 | 0110 | 16 | FF91 |
| 0011 | 0111 | 16 | FF92 |
| 0011 | 1000 | 16 | FF93 |
| 0011 | 1001 | 16 | FF94 |
| 0011 | 1010 | 16 | FF95 |
| 0100 | 0001 | 6 | 003B |
| 0100 | 0010 | 10 | 03F8 |
| 0100 | 0011 | 16 | FF96 |
| 0100 | 0100 | 16 | FF97 |
| 0100 | 0101 | 16 | FF98 |
| 0100 | 0110 | 16 | FF99 |
| 0100 | 0111 | 16 | FF9A |
| 0100 | 1000 | 16 | FF9B |
| 0100 | 1001 | 16 | FF9C |
| 0100 | 1010 | 16 | FF9D |
| 0101 | 0001 | 7 | 007A |
| 0101 | 0010 | 11 | 07F7 |
| 0101 | 0011 | 16 | FF9E |
| 0101 | 0100 | 16 | FF9F |
| 0101 | 0101 | 16 | FFA0 |
| 0101 | 0110 | 16 | FFA1 |
| 0101 | 0111 | 16 | FFA2 |
| 0101 | 1000 | 16 | FFA3 |
| 0101 | 1001 | 16 | FFA4 |
| 0101 | 1010 | 16 | FFA5 |
| 0110 | 0001 | 7 | 007B |
| 0110 | 0010 | 12 | 0FF6 |
| 0110 | 0011 | 16 | FFA6 |
| 0110 | 0100 | 16 | FFA7 |
| 0110 | 0101 | 16 | FFA8 |
| 0110 | 0110 | 16 | FFA9 |
| 0110 | 0111 | 16 | FFAA |
| 0110 | 1000 | 16 | FFAB |
| 0110 | 1001 | 16 | FFAC |
| 0110 | 1010 | 16 | FFAD |
| 0111 | 0001 | 8 | 00FA |
| 0111 | 0010 | 12 | 0FF7 |
| 0111 | 0011 | 16 | FFAE |
| 0111 | 0100 | 16 | FFAF |
| 0111 | 0101 | 16 | FFB0 |
| 0111 | 0110 | 16 | FFB1 |
| 0111 | 0111 | 16 | FFB2 |
| 0111 | 1000 | 16 | FFB3 |
| 0111 | 1001 | 16 | FFB4 |
| 0111 | 1010 | 16 | FFB5 |
| 1000 | 0001 | 9 | 01F8 |
| 1000 | 0010 | 15 | 7FC0 |
| 1000 | 0011 | 16 | FFB6 |
| 1000 | 0100 | 16 | FFB7 |
| 1000 | 0101 | 16 | FFB8 |
| 1000 | 0110 | 16 | FFB9 |
| 1000 | 0111 | 16 | FFBA |
| 1000 | 1000 | 16 | FFBB |
| 1000 | 1001 | 16 | FFBC |
| 1000 | 1010 | 16 | FFBD |
| 1001 | 0001 | 9 | 01F9 |
| 1001 | 0010 | 16 | FFBE |
| 1001 | 0011 | 16 | FFBF |
| 1001 | 0100 | 16 | FFC0 |
| 1001 | 0101 | 16 | FFC1 |
| 1001 | 0110 | 16 | FFC2 |
| 1001 | 0111 | 16 | FFC3 |
| 1001 | 1000 | 16 | FFC4 |
| 1001 | 1001 | 16 | FFC5 |
| 1001 | 1010 | 16 | FFC6 |
| 1010 | 0001 | 9 | 01FA |
| 1010 | 0010 | 16 | FFC7 |
| 1010 | 0011 | 16 | FFC8 |
| 1010 | 0100 | 16 | FFC9 |
| 1010 | 0101 | 16 | FFCA |
| 1010 | 0110 | 16 | FFCB |
| 1010 | 0111 | 16 | FFCC |
| 1010 | 1000 | 16 | FFCD |
| 1010 | 1001 | 16 | FFCE |
| 1010 | 1010 | 16 | FFCF |
| 1011 | 0001 | 10 | 03F9 |
| 1011 | 0010 | 16 | FFD0 |
| 1011 | 0011 | 16 | FFD1 |
| 1011 | 0100 | 16 | FFD2 |
| 1011 | 0101 | 16 | FFD3 |
| 1011 | 0110 | 16 | FFD4 |
| 1011 | 0111 | 16 | FFD5 |
| 1011 | 1000 | 16 | FFD6 |
| 1011 | 1001 | 16 | FFD7 |
| 1011 | 1010 | 16 | FFD8 |
| 1100 | 0001 | 10 | 03FA |
| 1100 | 0010 | 16 | FFD9 |
| 1100 | 0011 | 16 | FFDA |
| 1100 | 0100 | 16 | FFDB |
| 1100 | 0101 | 16 | FFDC |
| 1100 | 0110 | 16 | FFDD |
| 1100 | 0111 | 16 | FFDE |
| 1100 | 1000 | 16 | FFDF |
| 1100 | 1001 | 16 | FFE0 |
| 1100 | 1010 | 16 | FFE1 |
| 1101 | 0001 | 11 | 07F8 |
| 1101 | 0010 | 16 | FFE2 |
| 1101 | 0011 | 16 | FFE3 |
| 1101 | 0100 | 16 | FFE4 |
| 1101 | 0101 | 16 | FFE5 |
| 1101 | 0110 | 16 | FFE6 |
| 1101 | 0111 | 16 | FFE7 |
| 1101 | 1000 | 16 | FFE8 |
| 1101 | 1001 | 16 | FFE9 |
| 1101 | 1010 | 16 | FFEA |
| 1110 | 0001 | 16 | FFEB |
| 1110 | 0010 | 16 | FFEC |
| 1110 | 0011 | 16 | FFED |
| 1110 | 0100 | 16 | FFEE |
| 1110 | 0101 | 16 | FFEF |
| 1110 | 0110 | 16 | FFF0 |
| 1110 | 0111 | 16 | FFF1 |
| 1110 | 1000 | 16 | FFF2 |
| 1110 | 1001 | 16 | FFF3 |
| 1110 | 1010 | 16 | FFF4 |
| 1111 | 0000 | 11 | 07F9 |
| 1111 | 0001 | 16 | FFF5 |
| 1111 | 0010 | 16 | FFF6 |
| 1111 | 0011 | 16 | FFF7 |
| 1111 | 0100 | 16 | FFF8 |

FIG. 8

| RRRR | SSSS | CODE LENGTH | HUFFMAN CODE |
|------|------|-------------|--------------|
| 0000 | 0000 | 2  | 0000 |
| 0000 | 0001 | 2  | 0001 |
| 0000 | 0010 | 3  | 0004 |
| 0000 | 0011 | 4  | 000A |
| 0000 | 0100 | 5  | 0016 |
| 0000 | 0101 | 5  | 0019 |
| 0000 | 0110 | 6  | 0038 |
| 0000 | 0111 | 7  | 0078 |
| 0000 | 1000 | 9  | 01F4 |
| 0000 | 1001 | 10 | 03F6 |
| 0000 | 1010 | 12 | 0FF4 |
| 0001 | 0001 | 4  | 000B |
| 0001 | 0010 | 6  | 0039 |
| 0001 | 0011 | 8  | 00F6 |
| 0001 | 0100 | 9  | 01F5 |
| 0001 | 0101 | 11 | 07F6 |
| 0001 | 0110 | 12 | 0FF5 |
| 0001 | 0111 | 16 | FF88 |
| 0001 | 1000 | 16 | FF89 |
| 0001 | 1001 | 16 | FF8A |
| 0001 | 1010 | 16 | FF8B |
| 0010 | 0001 | 5  | 001A |
| 0010 | 0010 | 8  | 00F7 |
| 0010 | 0011 | 10 | 03F7 |
| 0010 | 0100 | 12 | 0FF6 |
| 0010 | 0101 | 15 | 7FC2 |
| 0010 | 0110 | 16 | FF8C |
| 0010 | 0111 | 16 | FF8D |
| 0010 | 1000 | 16 | FF8E |
| 0010 | 1001 | 16 | FF8F |
| 0010 | 1010 | 16 | FF90 |
| 0011 | 0001 | 5  | 001B |
| 0011 | 0010 | 8  | 00F8 |
| 0011 | 0011 | 10 | 03F8 |
| 0011 | 0100 | 12 | 0FF7 |
| 0011 | 0101 | 16 | FF91 |
| 0011 | 0110 | 16 | FF92 |
| 0011 | 0111 | 16 | FF93 |
| 0011 | 1000 | 16 | FF94 |
| 0011 | 1001 | 16 | FF95 |
| 0011 | 1010 | 16 | FF96 |
| 0100 | 0001 | 6  | 003A |
| 0100 | 0010 | 9  | 01F6 |
| 0100 | 0011 | 16 | FF97 |
| 0100 | 0100 | 16 | FF98 |
| 0100 | 0101 | 16 | FF99 |
| 0100 | 0110 | 16 | FF9A |
| 0100 | 0111 | 16 | FF9B |
| 0100 | 1000 | 16 | FF9C |
| 0100 | 1001 | 16 | FF9D |
| 0100 | 1010 | 16 | FF9E |
| 0101 | 0001 | 6  | 003B |
| 0101 | 0010 | 10 | 03F9 |
| 0101 | 0011 | 16 | FF9F |
| 0101 | 0100 | 16 | FFA0 |
| 0101 | 0101 | 16 | FFA1 |
| 0101 | 0110 | 16 | FFA2 |
| 0101 | 0111 | 16 | FFA3 |
| 0101 | 1000 | 16 | FFA4 |
| 0101 | 1001 | 16 | FFA5 |
| 0101 | 1010 | 16 | FFA6 |
| 0110 | 0001 | 7  | 0079 |
| 0110 | 0010 | 11 | 07F7 |
| 0110 | 0011 | 16 | FFA7 |
| 0110 | 0100 | 16 | FFA8 |
| 0110 | 0101 | 16 | FFA9 |
| 0110 | 0110 | 16 | FFAA |
| 0110 | 0111 | 16 | FFAB |
| 0110 | 1000 | 16 | FFAC |
| 0110 | 1001 | 16 | FFAD |
| 0110 | 1010 | 16 | FFAE |
| 0111 | 0001 | 7  | 007A |
| 0111 | 0010 | 11 | 07F8 |
| 0111 | 0011 | 16 | FFAF |
| 0111 | 0100 | 16 | FFB0 |
| 0111 | 0101 | 16 | FFB1 |
| 0111 | 0110 | 16 | FFB2 |
| 0111 | 0111 | 16 | FFB3 |
| 0111 | 1000 | 16 | FFB4 |
| 0111 | 1001 | 16 | FFB5 |
| 0111 | 1010 | 16 | FFB6 |
| 1000 | 0001 | 8  | 00F9 |
| 1000 | 0010 | 16 | FFB7 |
| 1000 | 0011 | 16 | FFB8 |
| 1000 | 0100 | 16 | FFB9 |
| 1000 | 0101 | 16 | FFBA |
| 1000 | 0110 | 16 | FFBB |
| 1000 | 0111 | 16 | FFBC |
| 1000 | 1000 | 16 | FFBD |
| 1000 | 1001 | 16 | FFBE |
| 1000 | 1010 | 16 | FFBF |
| 1001 | 0001 | 9  | 01F7 |
| 1001 | 0010 | 16 | FFC0 |
| 1001 | 0011 | 16 | FFC1 |
| 1001 | 0100 | 16 | FFC2 |
| 1001 | 0101 | 16 | FFC3 |
| 1001 | 0110 | 16 | FFC4 |
| 1001 | 0111 | 16 | FFC5 |
| 1001 | 1000 | 16 | FFC6 |
| 1001 | 1001 | 16 | FFC7 |
| 1001 | 1010 | 16 | FFC8 |
| 1010 | 0001 | 9  | 01F8 |
| 1010 | 0010 | 16 | FFC9 |
| 1010 | 0011 | 16 | FFCA |
| 1010 | 0100 | 16 | FFCB |
| 1010 | 0101 | 16 | FFCC |
| 1010 | 0110 | 16 | FFCD |
| 1010 | 0111 | 16 | FFCE |
| 1010 | 1000 | 16 | FFCF |
| 1010 | 1001 | 16 | FFD0 |
| 1010 | 1010 | 16 | FFD1 |
| 1011 | 0001 | 9  | 01F9 |
| 1011 | 0010 | 16 | FFD2 |
| 1011 | 0011 | 16 | FFD3 |
| 1011 | 0100 | 16 | FFD4 |
| 1011 | 0101 | 16 | FFD5 |
| 1011 | 0110 | 16 | FFD6 |
| 1011 | 0111 | 16 | FFD7 |
| 1011 | 1000 | 16 | FFD8 |
| 1011 | 1001 | 16 | FFD9 |
| 1011 | 1010 | 16 | FFDA |
| 1100 | 0001 | 9  | 01FA |
| 1100 | 0010 | 16 | FFDB |
| 1100 | 0011 | 16 | FFDC |
| 1100 | 0100 | 16 | FFDD |
| 1100 | 0101 | 16 | FFDE |
| 1100 | 0110 | 16 | FFDF |
| 1100 | 0111 | 16 | FFE0 |
| 1100 | 1000 | 16 | FFE1 |
| 1100 | 1001 | 16 | FFE2 |
| 1100 | 1010 | 16 | FFE3 |
| 1101 | 0001 | 11 | 07F9 |
| 1101 | 0010 | 16 | FFE4 |
| 1101 | 0011 | 16 | FFE5 |
| 1101 | 0100 | 16 | FFE6 |
| 1101 | 0101 | 16 | FFE7 |
| 1101 | 0110 | 16 | FFE8 |
| 1101 | 0111 | 16 | FFE9 |
| 1101 | 1000 | 16 | FFEA |
| 1101 | 1001 | 16 | FFEB |
| 1101 | 1010 | 16 | FFEC |
| 1110 | 0001 | 14 | 3FE0 |
| 1110 | 0010 | 16 | FFED |
| 1110 | 0011 | 16 | FFEE |
| 1110 | 0100 | 16 | FFEF |
| 1110 | 0101 | 16 | FFF0 |
| 1110 | 0110 | 16 | FFF1 |
| 1110 | 0111 | 16 | FFF2 |
| 1110 | 1000 | 16 | FFF3 |
| 1110 | 1001 | 16 | FFF4 |
| 1110 | 1010 | 16 | FFF5 |
| 1111 | 0000 | 10 | 03FA |
| 1111 | 0001 | 15 | 7FC3 |
| 1111 | 0010 | 16 | FFF6 |
| 1111 | 0011 | 16 | FFF7 |
| 1111 | 0100 | 16 | FFF8 |

FIG. 9

| SSSS | CODE LENGTH | HUFFMAN CODE |
|---|---|---|
| 0000 | 2 | 0000 |
| 0001 | 3 | 0002 |
| 0010 | 3 | 0003 |
| 0011 | 3 | 0004 |
| 0100 | 3 | 0005 |
| 0101 | 3 | 0006 |
| 0110 | 4 | 000E |
| 0111 | 5 | 001E |
| 1000 | 6 | 003E |
| 1001 | 7 | 007E |
| 1010 | 8 | 00FE |
| 1011 | 9 | 01FE |
| 1100 | 10 | 03FE |
| 1101 | 11 | 07FE |
| 1110 | 12 | 0FFE |
| 1111 | 13 | 1FFE |

FIG. 10

| SSSS | CODE LENGTH | HUFFMAN CODE |
|---|---|---|
| 0000 | 2 | 0000 |
| 0001 | 2 | 0001 |
| 0010 | 2 | 0002 |
| 0011 | 3 | 0006 |
| 0100 | 4 | 000E |
| 0101 | 5 | 001E |
| 0110 | 6 | 003E |
| 0111 | 7 | 007E |
| 1000 | 8 | 00FE |
| 1001 | 9 | 01FE |
| 1010 | 10 | 03FE |
| 1011 | 11 | 07FE |
| 1100 | 12 | 0FFE |
| 1101 | 13 | 1FFE |
| 1110 | 14 | 3FFE |
| 1111 | 15 | 7FFE |

IMAGE-PROCESSING METHOD AND PROGRAM, AND IMAGE-PROCESSING APPARATUS

BACKGROUND

1. Technical Field

The present invention relates to an image-processing method and program, and to an image-processing apparatus.

2. Related Art

Recently, as techniques for compressing image data, techniques that compress image data by using the Joint Photographic Experts Group (JPEG) system have been proposed (for example, refer to JPEGJFIF, [online], [searched for on the 28 Sep. 2009], Internet <URL:http://www.w3.org/Graphics/JPEG/>).

In the case where image data is to be compressed using this type of compression system, when a block composed of part of or all of the image data is monochrome, there is an issue in making such a block be compressed more rapidly.

SUMMARY

An image-processing method and program, and an image-processing apparatus according to aspects of the invention are principally advantageous in that, in the case where a block composed of part of or all of image data is monochrome, the block is compressed more rapidly.

In an image-processing method and program, and a image-processing apparatus according to the aspects of the invention, the following are adopted in order to achieve the above-described principle advantage.

An image-processing method for compressing image data according to an aspect of the invention, includes:

(a) obtaining a block composed of part of or all of the image data;

(b) determining whether the obtained black is color or monochrome; and (c) performing, in the case where the obtained block is determined to be color, compression processing in parallel for a predetermined number of elements of a predetermined color system, and performing, in the case where the obtained block is determined to be monochrome, the compression processing in parallel for individual areas obtained by dividing a division block containing the obtained block into a predetermined number of pieces for a single component of the predetermined color system.

In the image-processing method according to the aspect of the invention, a block composed of part of or all of the image data is obtained, it is determined whether the obtained block is color or monochrome, and in the case where the obtained block is determined to be color, compression processing is performed in parallel for a predetermined number of elements of a predetermined color system, and in the case where the obtained block is determined to be monochrome the compression processing is performed in parallel for individual areas obtained by dividing a division block containing the obtained block into a predetermined number of pieces for a single component of the predetermined color system. Therefore, in the case where the block is monochrome, since compression processing is performed in parallel for the predetermined number of individual areas, the block can be more rapidly compressed than in the case where the block is subjected to compression processing without having been first divided into a predetermined number of areas, or than in the case where the block is divided into a predetermined number of areas and is then subjected to compression processing one area at a time in sequence. Furthermore, since the same number of parallel operations are carried out when compression processing is performed in both the case where a block is color and the case where a block is monochrome, compression processing can be performed in a similar manner in both the case where a block is color and the case where a block is monochrome. Of course, when the image data is compressed, since compression processing is performed in parallel for a predetermined number of elements in the case where a block is color, the block can be compressed more rapidly than in the case where the compression processing is performed one element at a time.

In the image-processing method according to the aspect of the invention, in (c), in the case where the obtained block is determined to be monochrome, it is preferable that the individual areas be set by equally dividing the division block into a predetermined number of areas in the left-right direction. Furthermore, in the case where the obtained block is determined to be monochrome, in (c), it is preferable that the individual areas be set by dividing the division block into a predetermined number Of areas by using different methods for one portion of and for the remaining portion of the division block. In the latter case, in (c), in the case where the obtained block is determined to be monochrome, it is preferable that the individual areas be set by equally dividing the one portion of the division block in the left-right direction and that, for the remaining portion of the division block, the individual areas be set such that areas to be units when the compression processing is performed alternate with each other.

Furthermore, in the image-processing method according to the aspect of the invention, in (c), in the case where the obtained block is determined to be color, it is preferable that the compression processing be performed in parallel for the predetermined number of elements in units having a first predetermined number of pixels in the vertical and horizontal directions, and, in the case where the obtained block is determined to be monochrome, that the compression processing be performed in parallel for the predetermined number of elements in units having a second predetermined number of pixels in the vertical and horizontal directions for each of the predetermined number of areas. Here, the first predetermined number of pixels and the second predetermined number of pixels may be the same value or may be different values, for example they can be 8 and 16 or the like. In the image-processing method according to the aspect of the invention, it is preferable that the block that is obtained in (a) have a size equal to a predetermined number of times or more the size of the unit having the second predetermined number of pixels in the vertical and horizontal directions.

Furthermore, in the image-processing method according to the aspect of the invention, in (c), in the case where the obtained block is determined to be color, it is preferable that the compression processing be performed in parallel for four elements of the YCbCr color system and, in the case where the obtained block is determined to be monochrome, it is preferable that that the compression processing be performed in parallel for individual areas obtained by dividing the division block containing the obtained block into four pieces for an element for a Y component of the YCbCr color system. Here, the four elements of the YCbCr color system in the case where it has been determined that the obtained block is color can be an element for the Y component, an element for the Cb component, an element for the Cr component and an element for the transparency, or can be two elements for the Y component, one element for the Cb component and one element for the Cr component.

A program according to another aspect of the invention is a program for causing a computer to execute each step of the above-described image-processing method. This program may be recorded on a computer-readable recording medium (for example, a hard disk, a ROM, an FD, a CD or a DVD) or may be distributed from a certain computer to another computer via a transmission medium (a communications network such as the Internet or a LAN), or may be given and received in any other form. Regardless of whether the program is executed on a single computer or whether the individual steps are executed by being allocated to a plurality of computers, since the individual steps of the image-processing method according to the aspect of the invention are executed, the same operational effect as the image-processing method according to the aspect of the invention is obtained.

An image-processing apparatus that compresses image data, according to yet another aspect of the invention, includes:

an obtaining unit that obtains a block composed of part of or all of the image data;

a determining unit that determines whether the obtained block is color or monochrome; and a compression unit that performs, in the case where the obtained block is determined to be color, compression processing in parallel for a predetermined number of elements of a predetermined color system, and in the case where the obtained block is determined to be monochrome, performs the compression processing in parallel for individual areas obtained by dividing a division block containing the obtained block into a predetermined number of pieces for a single component of the predetermined color system.

In the image-processing apparatus according to the yet another aspect of the invention, a block is obtained that is composed of part of or all of the image data, it is determined whether the obtained block is color or, monochrome, in the case where the obtained block is determined to be color, compression processing is performed in parallel for a predetermined number of elements of a predetermined color system, and, in the case where the obtained block is determined to be monochrome, compression processing is performed in parallel for individual areas obtained by dividing a division block containing the obtained block into a predetermined number of pieces for a single component of the predetermined color system. Therefore, in the case where the block is monochrome, since compression processing is performed for a predetermined number of areas in parallel, the block can be compressed more rapidly than in the case where a block is subjected to compression processing without having been first divided into a predetermined number of areas or in the case where a block is divided into a predetermined number of areas and is then subjected to compression processing a single area at a time in sequence. Furthermore, since the same number of parallel operations are carried out when compression processing is performed in both the case where a block is color and the case where a block is monochrome, compression processing can be performed in a similar way in both the case where a block is color and in the case where a block is monochrome. Of course, when image data is compressed, since compression processing is performed in parallel for a predetermined number of elements in the case where the block is color, the block can be compressed more rapidly than in the case where compression processing is performed one element at a time.

BRIEF DESCRIPTION OF THE DRAWINGS

The invention will be described with reference to the accompanying drawings, wherein like numbers reference like elements.

FIG. 5 is an explanatory diagram illustrating an example of a quantization table for Yc and $\alpha$.

FIG. 6 is an explanatory diagram illustrating an example of a quantization table for Cb and Cr.

FIG. 7 is an explanatory diagram illustrating an example of an AC Huffman table for Yc and $\alpha$.

FIG. 8 is an explanatory diagram illustrating an example of a AC Huffman table for Cb and Cr.

FIG. 9 is an explanatory diagram illustrating an example of a DC Huffman table for Yc and $\alpha$.

FIG. 10 is an explanatory diagram illustrating an example of a DC Huffman table for Cb and Cr.

DESCRIPTION OF EXEMPLARY EMBODIMENTS

Figure 1:
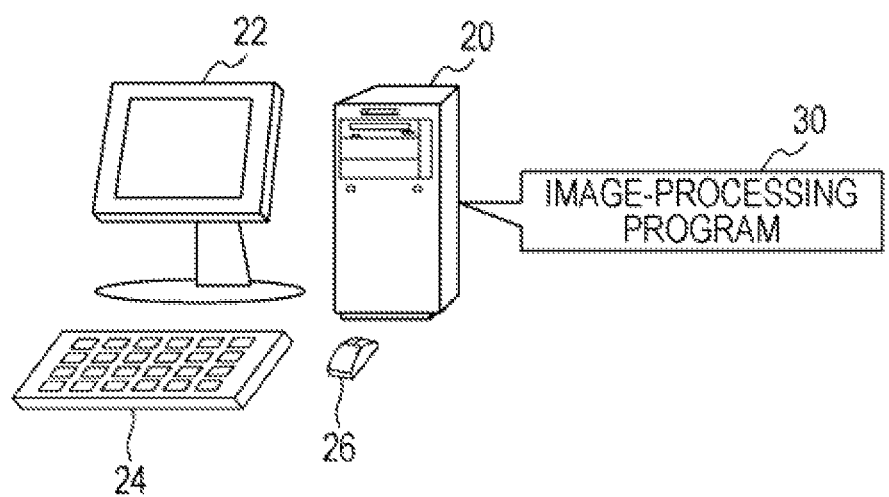
FIG. 1 is a configurational diagram illustrating an outline configuration of a computer 20.

Next, embodiments of the invention will be described with reference to the drawings. FIG. 1 is a configurational diagram illustrating an outline configuration of a computer 20 serving as an image-processing apparatus according to an embodiment of the invention. The computer 20 according to this embodiment is configured as a general-purpose computer equipped with a CPU, which serves as a central arithmetic processing device, a ROM, which stores a processing program, a RAM, which temporarily stores data, a graphics processor (GPU), a hard disk (HDD) and the like. The computer 20 is connected to a display 22, a keyboard 24, a mouse 26 and the like through an input/output processing circuit. In this embodiment, an image-processing program 30, which compresses image data by using the Joint Photographic Experts Group (JPEG) system, is installed in the computer 20 and the hardware and software function in an integrated manner such that the computer 20 functions as an image-processing apparatus.

Figure 2:
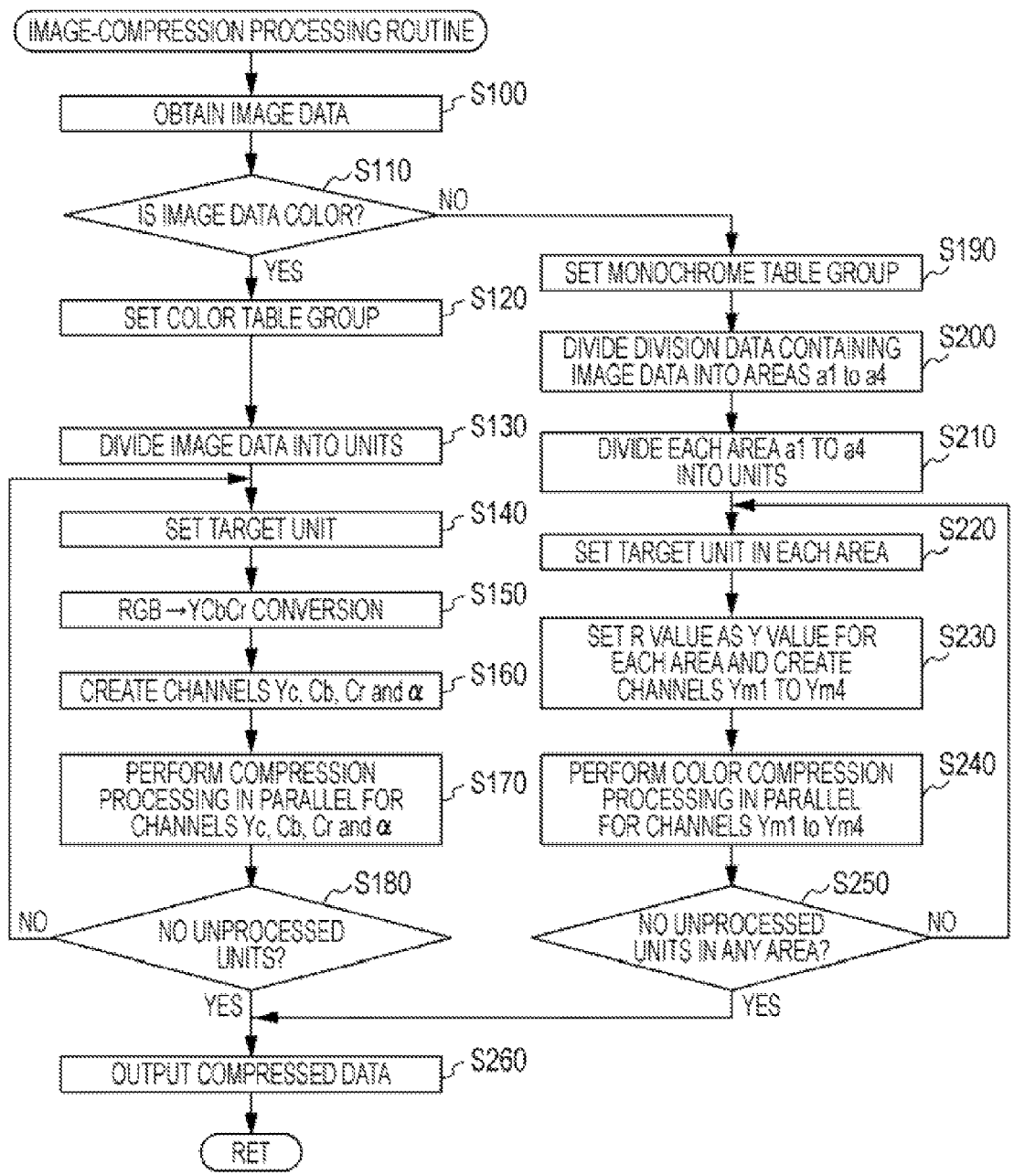
FIG. 2 is a flowchart illustrating an example of an image compression processing routine.

Next, operation of the computer 20 according to this embodiment having the above-described configuration will be described. FIG. 2 is a flowchart illustrating an example of an image compression processing routine executed by the computer 20. This routine is executed when a user instructs that selected image data is to be compressed using the JPEG compression system by operating the keyboard 24 and the mouse 26. In this embodiment, the selected image data is expressed using the RGB color system. In addition, the image data may be image data selected from among data stored in the computer 20 or may be image data selected from among image data obtainable by the computer 20 such as image data stored on an external storage medium (for example, one of a digital camera, a mobile telephone, or a CD/DVD apparatus), image data read using a scanner or captured by using a digital camera or a camera-equipped mobile telephone, or image data that is publicly available through a website or the like.

When the image compression processing routine is executed, the computer 20 obtains the image data (step S100) and determines whether the obtained image data is color or monochrome (step S110). In this embodiment, the entirety of the image data will be described as corresponding to a block in an aspect of the invention. Furthermore, in this embodiment, in the determination of whether the image data is color or monochrome, the values of R, G and B for the individual pixels of the image data in the RGB color system are compared, and when R=G=B for all of the pixels, it is determined that the image data is monochrome and when this is not the case it is determined that the image data is color.

In the case where the image data is determined to be color, as a color table group, a quantization table, an AC Huffman table and a DC Huffman table (hereafter, collectively referred to as a processing table group) to be used in to-be-described quantization, AC Huffman and DC Huffman processes, are set (step S120) and the image data is divided into a plurality of units each composed of 8×8 pixels (step S130). Here, the term "unit" refers to a unit of compression used when compressing image data and in this embodiment regardless of whether the image data is color or monochrome, the units; are of the same size. Furthermore, in this embodiment, the image data is divided into units starting from the upper-left corner and progressing in the rightward direction and then progressing in the downward direction in sequence. Accordingly, sometimes blank pixels are included in a block containing the right-hand edge or bottom edge of the image data.

Figure 3:
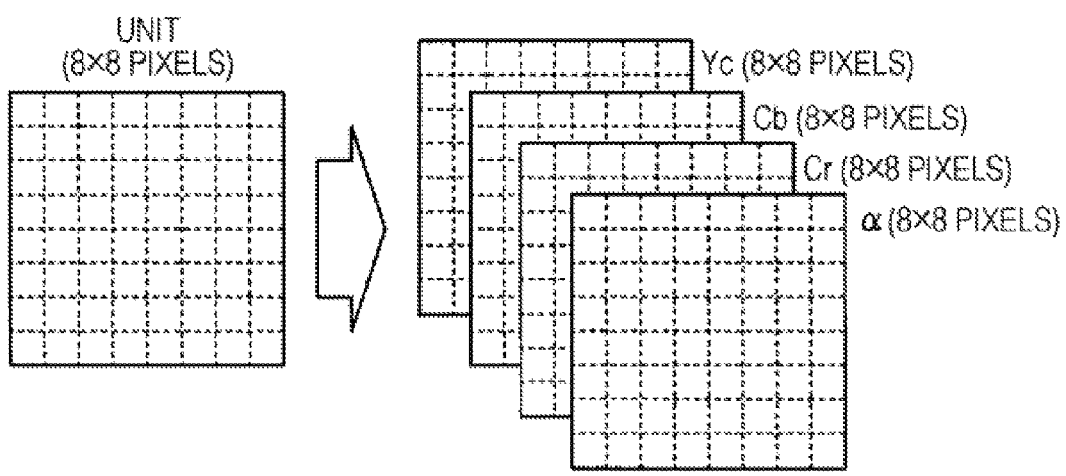
FIG. 3 is an explanatory diagram illustrating a way of creating channels Yc, Cb, Cr and $\alpha$.

Then, one of the units that have yet to be subjected to compression processing is set as a target unit (step S140), conversion is performed from the RGB color system, which is the color system of the target unit, to the YCbCr color system, and a channel Yc for the Y (luminance) component, a channel Cb for the Cb (difference between blue component and luminance) component, a channel Cr for the Cr (difference between red component and luminance) component and a channel a for the transparency are created (steps S150 and S160). Here, in this embodiment, setting of the target unit is performed sequentially in order from the left to the right and from top to bottom. An example of a way of creating the channels Yc, Cb, Cr and α is illustrated in FIG. 3.

Figure 4:
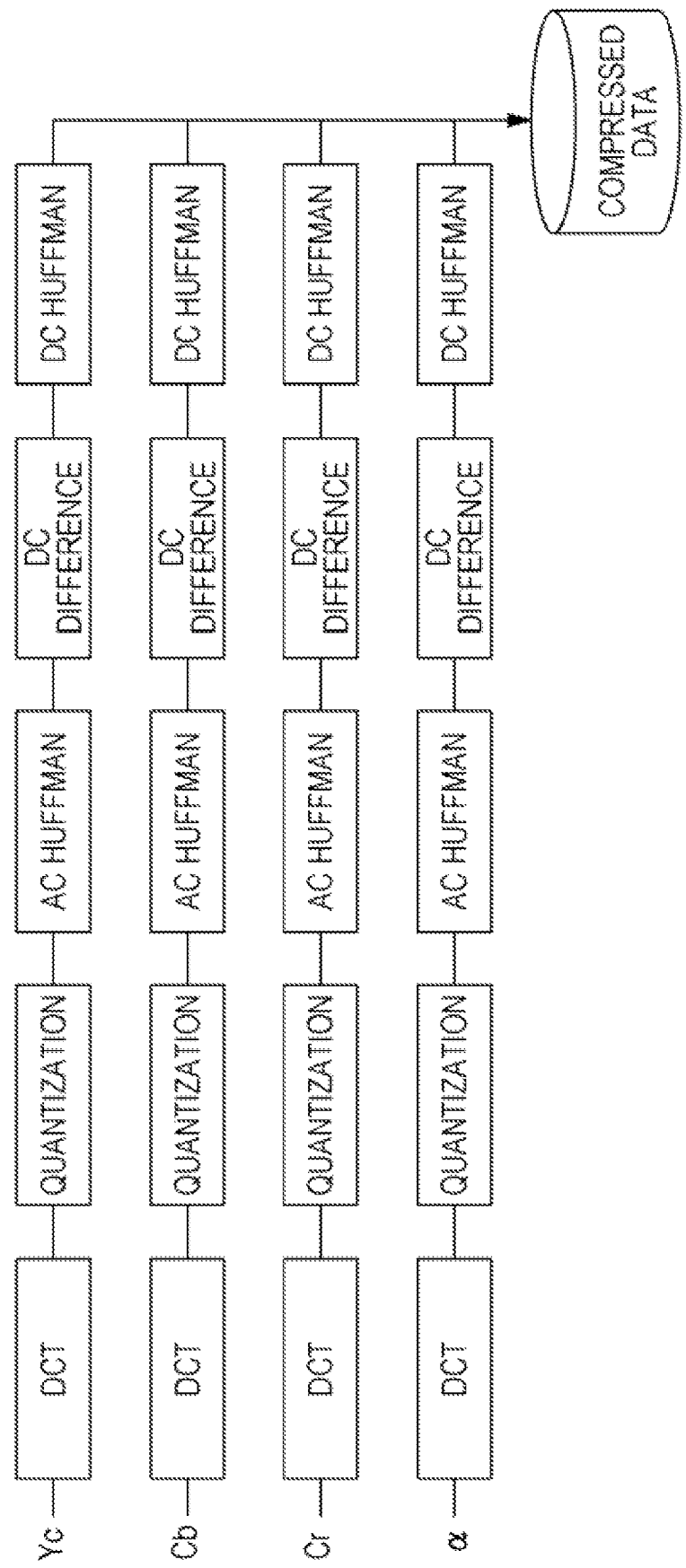
FIG. 4 is an explanatory diagram illustrating an example of compression processing.

When the channels Yc, Cb, Cr and α are created in this way, compression processing is performed in parallel for the created channels Yc, Cb, Cr and α using the processing table group (color table group) (Step S170). FIG. 4 is an explanatory diagram illustrating the compression processing in this case. Furthermore, FIG. 5 illustrates an example of a quantization table for Yc and α, FIG. 6 illustrates an example of a quantization table for Cb and Cr, FIG. 7 illustrates an example of an AC Huffman table for Yc and α, FIG. 8 illustrates an example of an AC Huffman table for Cb and Cr, FIG. 9 illustrates an example of a DC Huffman table for Yc and α and FIG. 10 illustrates an example of a DC Huffman table for Cb and Cr. The compression processing, as is clear from FIG. 4, can be performed by converting the values of components into DCT coefficients by using a discrete cosine transformation (DCT), subjecting the converted DCT coefficients to quantization, subjecting values (alternating current (alternating current (AC) components, hereafter AC coefficients)) other than those of the top-left corners (direct current (DC) components, hereafter DC coefficients) from among the quantized DCT coefficients (hereafter, post-quantization DCT coefficients) to AC Huffman coding and, after calculating the DC differences, subjecting the DC coefficients among the post-quantization DCT coefficients to DC Huffman coding. Therefore, in this embodiment, for the channels Yc and α, compression processing is performed by converting values of components into DCT coefficients using a discrete cosine transformation, subjecting the DCT coefficients to quantization by using the quantization table for Yc and α illustrated in FIG. 5, subjecting the AC coefficients among the post-quantization DCT coefficients to AC Huffman coding using the AC Huffman table for Yc and a illustrated in FIG. 7, and, after calculating the DC differences, subjecting the DC coefficients among the post-quantization DC coefficients to DC Huffman coding using the DC Huffman table for Yc and α illustrated in FIG. 9. For the channels Cb and Cr, compression processing is performed by converting the values of components into DCT coefficients by using a discrete cosine transformation, subjecting the DCT coefficients to quantization using the quantization table for Cb and Cr illustrated in FIG. 6, subjecting the AC coefficients among the post-quantization DCT coefficients to AC Huffman coding using the AC Huffman table for Cb and Cr illustrated in FIG. 8, and, after calculating the DC differences, subjecting the DC coefficients among the post-quantization DCT coefficients to DC Huffman coding using the DC Huffman table for Cb and Cr illustrated in FIG. 10. Here, in the case where the current target unit is not the first unit, calculation of the DC difference is processing in which the difference between the DC component of the current target unit and the DC component of the previous target unit for the same channel (for example, the channel Yc) is calculated. In this way, by performing the compression processing in parallel for the channels Yc, Cb Cr and α, the compression processing can be performed more rapidly than in the case where the compression processing is performed one channel at a time in sequence for the channels Yc, Cb, Cr and α. Moreover, discrete cosine transformation, quantization, AC Huffman coding, calculation of DC differences and DC Huffman coding are well-known processing operations and therefore the description thereof above has been omitted.

Then, it is determined whether or not there is a unit that has yet to be subjected to processing (step S180) and in the case where it is determined that there is a unit that has yet to be subjected to processing, the routine returns to step S140, and in the case where it is determined that there are no units that have yet to be subjected to processing, the compressed data created by compressing the image data is output by for example being displayed on the display 22 and stored in the hard disk (step S260), and then this routine ends.

Figure 11:
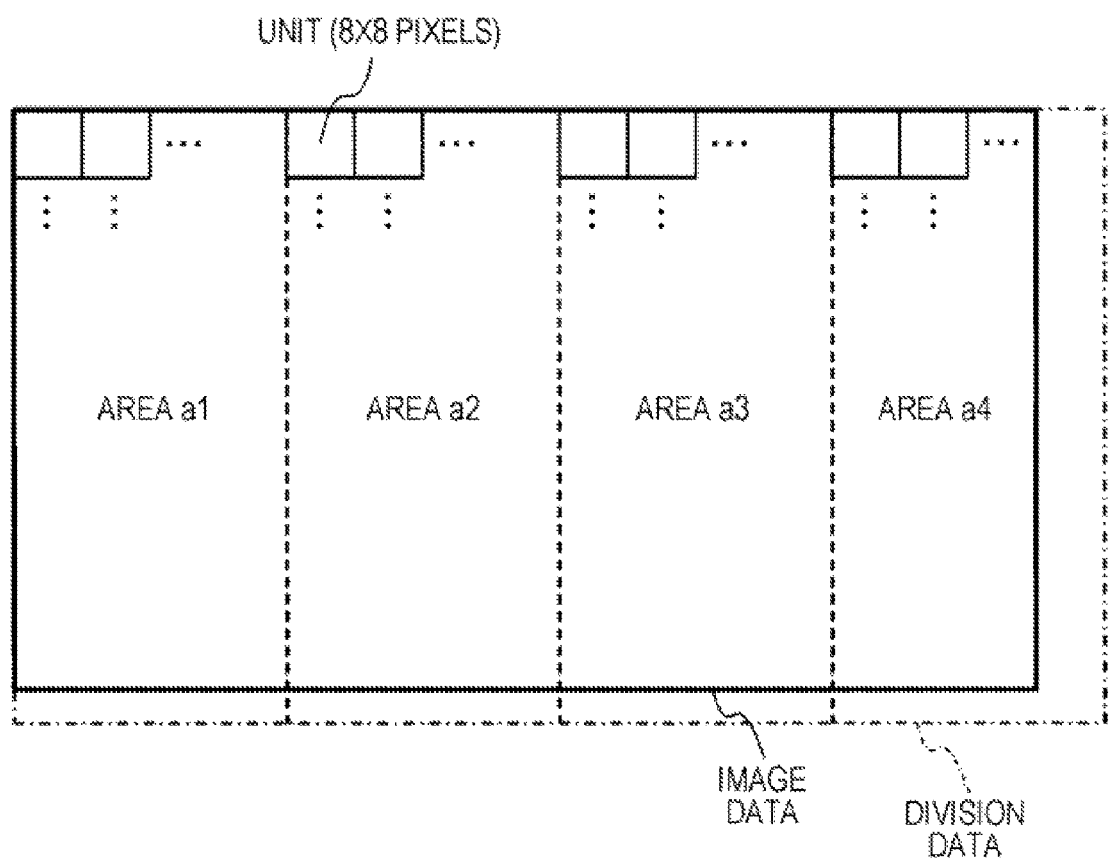
FIG. 11 is an explanatory diagram illustrating a way of dividing image data.

In the case where the image data is determined to be monochrome in step S110, a monochrome table group is set as a processing table group (step S190), the image data is divided into four areas a1 to a4 (step S200), and then each of the divided areas a1 to a4 is divided into units composed of 8×8 pixels (step S210). Here, in this embodiment, as the monochrome table group, the Yc and a table group is used from among the color table groups. Furthermore, in FIG. 11, an example is illustrated of a way of dividing the image data into areas a1 to a4 and then dividing each of the areas a1 to a4 into units. In this embodiment, division data is created by inserting blank spaces where necessary on the right-hand side of the image data such that the number of pixels in the horizontal direction is an integer multiple of the product of 8, which is the unit number of pixels in the horizontal direction, and 4, which is the number of areas into which division is being attempted (equal to the number of channels in the case where image data is color), and by inserting blank spaces where necessary on the bottom side of the image data such that the number of pixels in the vertical direction is an integer multiple of 8 pixels, which is the unit number of pixels in the vertical direction, and then the created division data is equally divided into four by dividing the number of pixels in the horizontal direction into four to create the areas a1 to a4.

Figure 12:
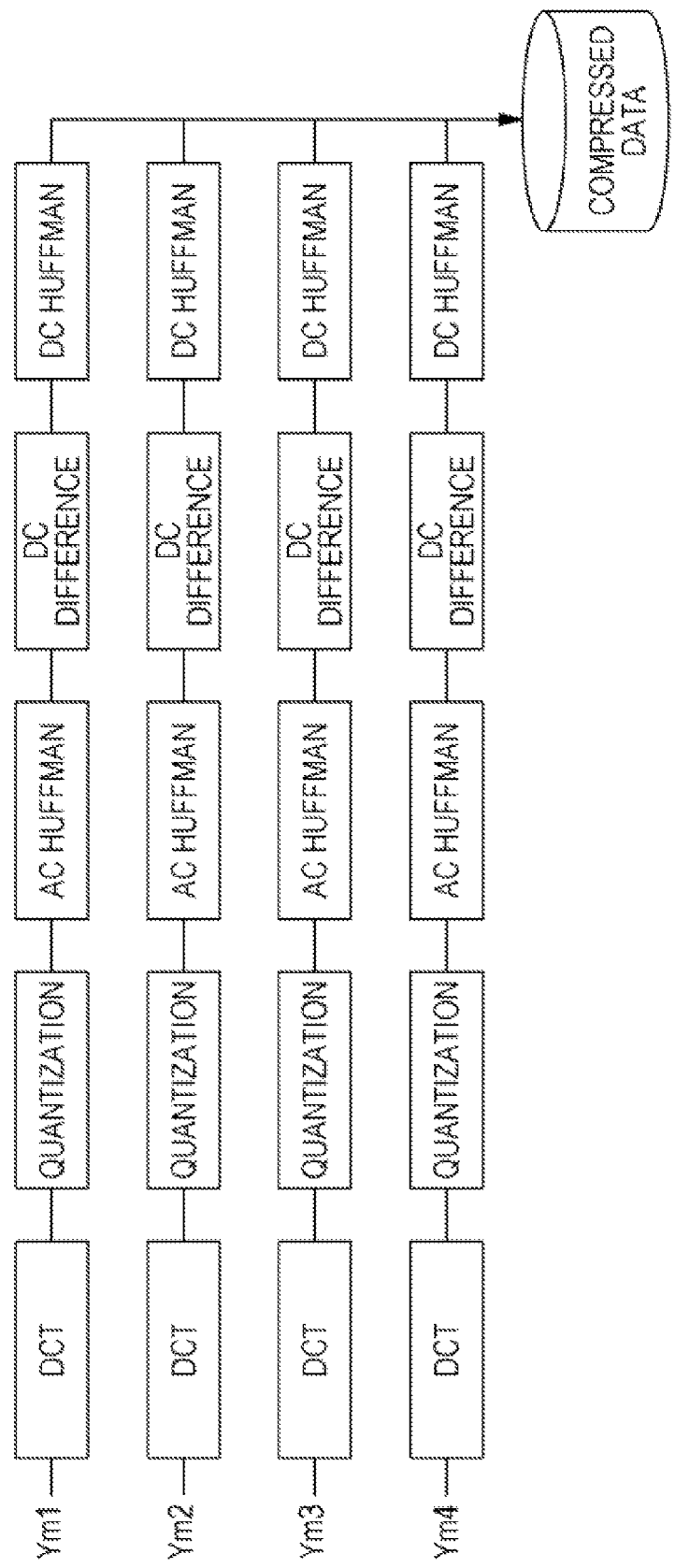
FIG. 12 is an explanatory diagram illustrating an example of compression processing.

When the areas a1 to a4 are created in this way, for each of the created areas a1 to a4, a single unit, which has yet to be subjected to compression processing is set as a target unit (step S220), the values of R, G and B in the RGB color system are equal to each other and these values are regarded as being equivalent to the value of Y in the YCbCr color system and channels Ym1 to Ym4 are created by taking the values of R (values of G or values of B also ok) in the RGB color system of the target units in the respective areas a1 to a4 to be values of Y in the YCbCr color system (step S230), and then compression processing is performed in parallel for the created channels Ym1 to Ym4 by using the processing table group (monochrome table group) (step S240). Then, it is determined whether or not there are units in the areas a1 to a4 that have yet to be subjected to processing (step S250) and when it is determined that there are units yet to be subjected to processing, the routine returns to step S220, whereas when it is determined that there are no units that have yet to be Subjected to processing, output is performed such as displaying the compressed data created by compressing the image data on the display 22 and storing the compressed data in the hard disk (step S260), and then the routine ends. FIG. 12 is an explanatory view illustrating the compression processing in this case. As is clear from FIG. 12, in the compression processing in this case, the channels Yc, Cb, Cr and a of the compression processing in FIG. 4 are replaced with the respective channels Ym1, Ym2, Ym3 and Ym4, and similarly to the compression processing in FIG. 4, in parallel, component values are converted into DCT coefficients through a discrete cosine transformation (DCT), the DCT coefficients are subjected to quantization using the quantization table for Yc and α illustrated in FIG. 5, the AC coefficients among the post-quantization DCT coefficients are subjected to AC Huffman coding using the AC Huffman table for Yc and α illustrated in FIG. 7, and after calculating DC differences, the DC coefficients among the post-quantization DCT coefficients are subjected to DC Huffman coding using the DC Huffman table for Yc and α illustrated in FIG. 9. By performing compression processing in this manner, image data can be more rapidly compressed than in the case of performing compression processing by setting a single channel for the Y component for every unit and not dividing the image data into areas a1 to a4 (performing compression processing using just the Yc channel in FIG. 4) or than in the case of performing compression processing for every unit for channels Ym1 to Ym4 one channel at a time in sequence. Furthermore, since compression processing can be performed in the same way by simply changing the channels in accordance with whether the image data is color or monochrome, the compression method can more easily adapt to color image data and to monochrome image data. Still furthermore, in the case where the image data is monochrome, since division data is divided into four pieces in the lateral direction to create areas a1 to a4 and then compression processing is performed in parallel for these respective areas, compression processing can be independently performed for all areas.

Next, the correspondence relationship between constituent elements of this embodiment and constituent elements of aspects of the invention will be made clear. The processing of step S100 of the image-compression processing routine of this embodiment corresponds to the processing of (a) of an aspect of the invention, the processing of step S110 corresponds to the processing of (b), and the processing of steps S120 to S250 correspond to the processing of (c). In addition, the computer 20 serving as an image-processing apparatus in this embodiment, corresponds to the obtaining unit, the determining unit and the compression unit of an aspect of the invention. Furthermore, in this embodiment, by describing the operation of the computer 20, an example of the program according to an aspect of the invention has also been made clear.

With the computer 20 of the above-described embodiment, in the case where the image data is color, compression processing is performed in parallel for channels Yc, Cb, Cr and α of the YcCbCr color system and in the case where the image data is monochrome, image compression is performed in parallel for channels Ym1 to Ym4 for the respective Y components of the YCbCr color system for areas a1 to a4 obtained by equally dividing into four pieces division data containing the image data. Therefore, image data can be more rapidly compressed in the case where the image data is monochrome.

Aspects of the invention are in no way limited to the above-described embodiment and can be implemented in a variety of forms within the technical scope thereof.

In the above-described embodiment, a unit is composed of 8×8 pixels, but not limited to this may be for example composed of 16×16 pixels.

Although, in the above-described embodiment, a unit is composed of 8×8 pixels regardless of whether the image data is color or monochrome, units of different sizes may be used in accordance with whether the image data is color or monochrome. For example, in the case where the image data is monochrome, a unit may be composed of 8×8 pixels and in the case where the image data is color, a unit may be composed of 16×16 pixels.

In the above-described embodiment, in the case where the image data is color, channels Yc, Cb, Cr and α are created and in the case where the image data is monochrome, channels Ym1 to Ym4 are created by dividing the image data into four areas. However, the number of channels is not limited to four and may be three or less or five or more.

Figure 13:
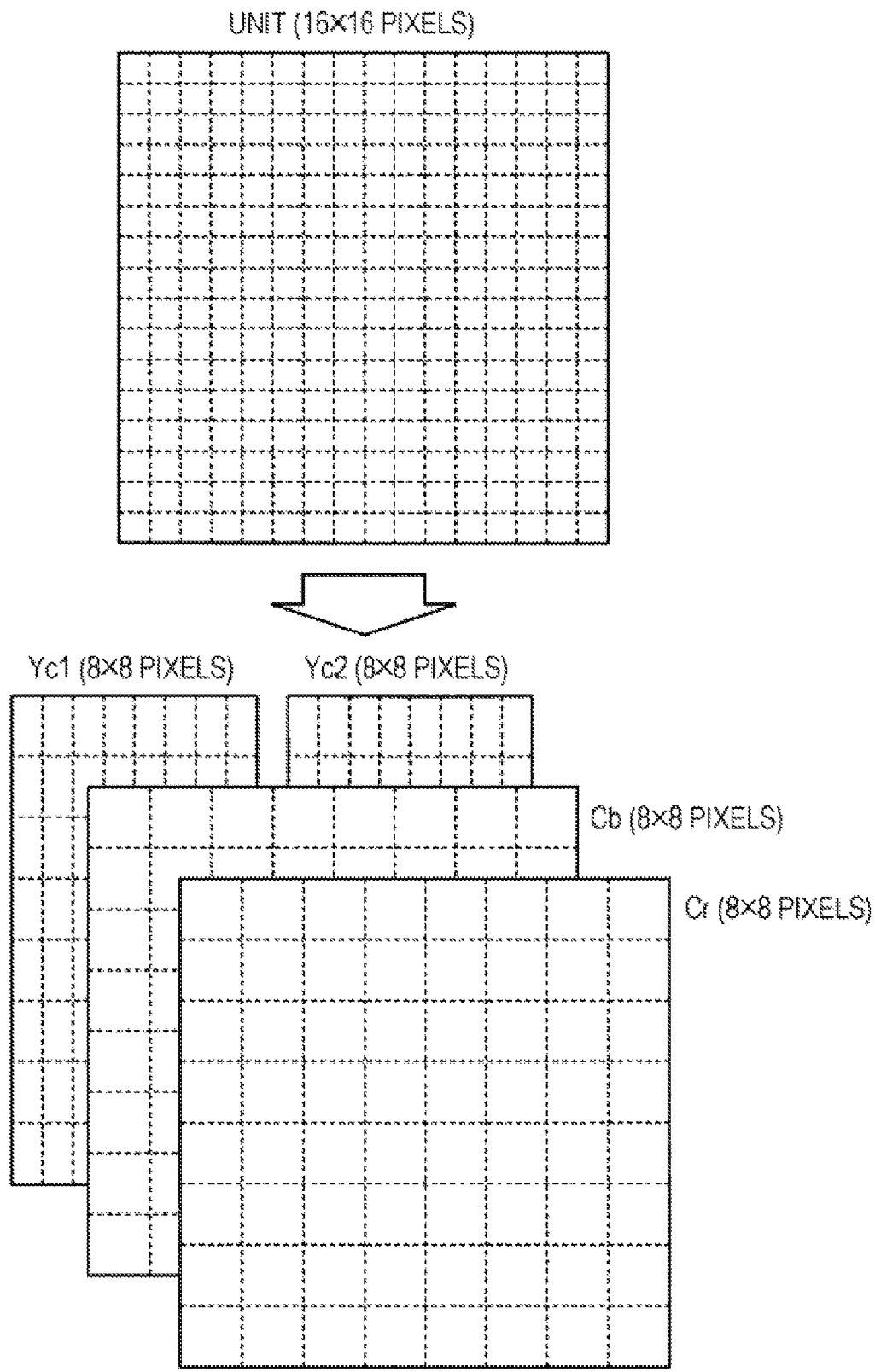
FIG. 13 is an explanatory diagram illustrating a way of creating channels Yc1, Yc2, Cb and Cr.
Figure 14:
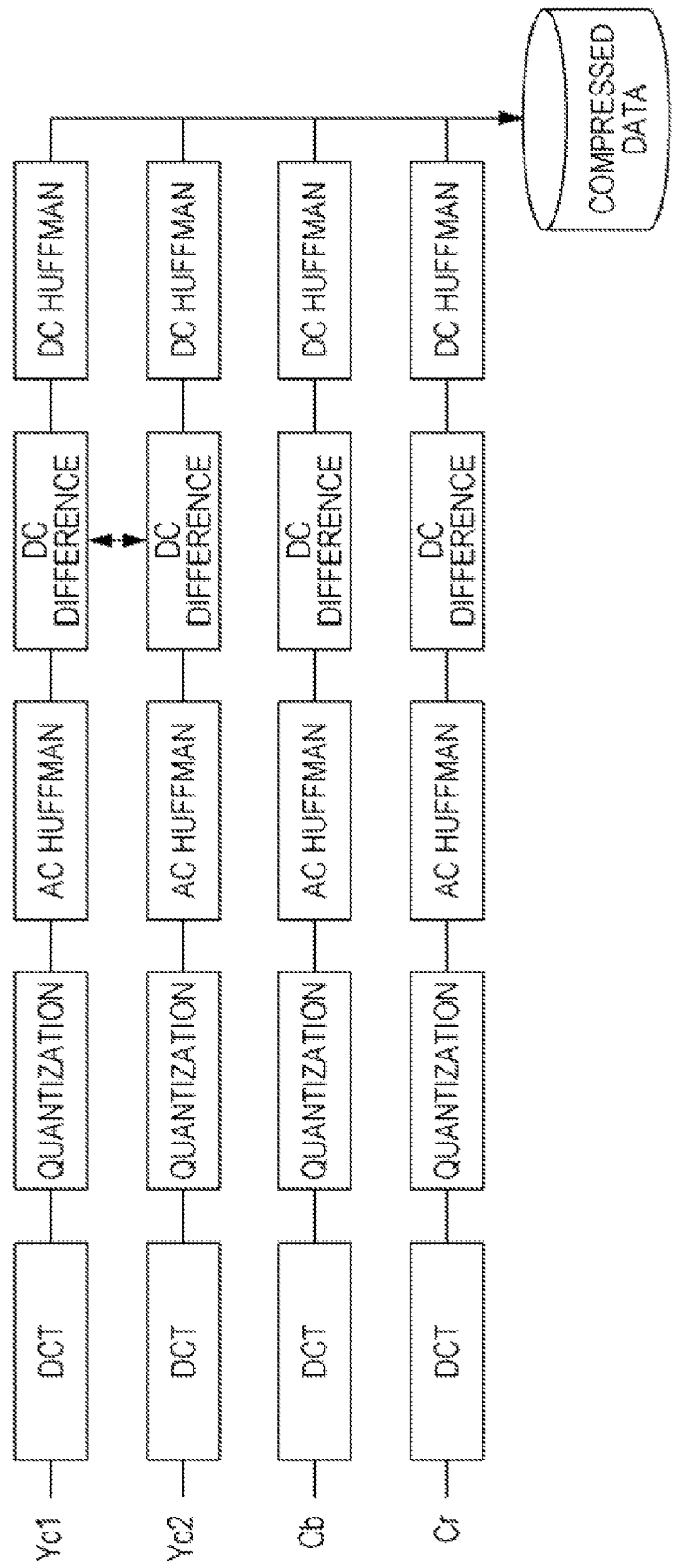
FIG. 14 is an explanatory diagram illustrating an example of compression processing.

In the above-described embodiment, in the case where the image data is color, channels Yc, Cb, Cr and α are created for every unit composed of 8×8 pixels, but not limited to this, for example channels Yc1 and Yc2 for the Y component and channels Cb and Cr for the Cb and Cr components of the YCbCr color system may be created for every unit composed of 16×16 pixels. FIG. 13 is an explanatory diagram illustrating an example of a way of creating channels Yc1, Yc2, Cb and Cr. Next, description will be given regarding the coordinates of each pixel (position from top, position from left) immediately after the color system is converted from the RGB color system to the YCbCr color system (before creating channels Yc1, Yc2, Cb and Cr). In the example of FIG. 13, the channel Yc1 is created by replacing every two vertical-direction pixels ([2k−1, j] and [2k, j], where k is 1 to 8) in the left-hand half ([i, j], i is 1 to 16, j is 1 to 8) of the target unit (16×16 pixels) with a single pixel, thereby giving 8×8 pixels and by making the value of Y of a pixel after replacement be the average of the values of Y of the two pixels prior to replacement. The channel Yc2 is created by replacing every two vertical-direction pixels ([2k−1, j] and [2k, j], where k is 1 to 8) of the right-hand half ([i, j,], i is 1 to 16, j is 9 to 16) of the target unit (16×16 pixels) with a single pixel, thereby giving 8×8 pixels and by making the value of Y of a pixel after replacement be the average of the values of Y of the two pixels prior to replacement. The channels Cb and Cr are created by replacing every 2×2 pixels ([2k−1, 2m−1] and [2k−1, 2 m] and [2k, 2m−1] and [2k, 2 m], where k is 1 to 8 and m is 1 to 8) of the target unit with a single pixel, thereby giving 8×8 pixels and by making the values of Cb and Cr after replacement be the averages of the values of Cb and Cr of the 2×2 pixels prior to replacement. An example of the compression processing in this case is illustrated in FIG. 14. In this case, as is clear from FIG. 14, the DC differences in the compression processing are calculated in the same way as in the above-described embodiment for channels Cb and Cr and the respective DC coefficients may be used in the calculations for the channels Yc1 and Yc2. More specifically, for the channel Yc1, in the case where the current target unit is not the first unit, the difference between the DC coefficient of the channel Yc1 of the current target unit and the DC coefficient of the channel Yc2 of the immediately previous target unit is calculated and for the channel Yc2, the difference between the DC coefficient of the channel Yc2 of the current target unit and the DC coefficient of the channel Yc1 of the current target unit may be calculated. Moreover, the calculation of the DC differences may be performed in the same way as in the above-described embodiment, regardless of whether it is for the channel Yc1, Yc2, Cb or Cr.

Figure 15:
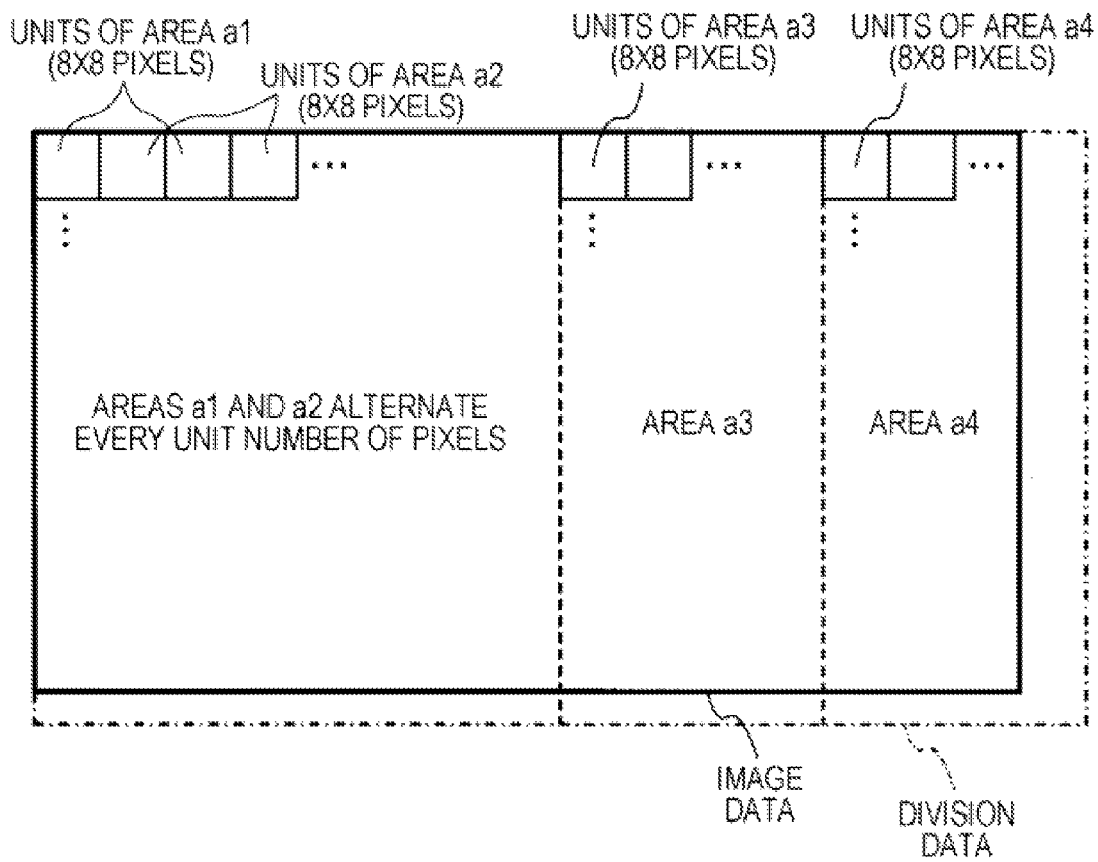
FIG. 15 is an explanatory diagram illustrating a way of dividing image data.

In the above-described embodiment, in the case where the image data is monochrome, division data containing the image data is equally divided into four pieces in the horizontal direction so as to create areas a1 to a4. However, not limited to this, areas a1 to a4 may be created by performing division using different methods for one portion of and the remaining portion of the division block. In this case for example for the left-hand half of the division data, areas a1 and areas a2 may be alternately set for every unit number of pixels in the horizontal direction (eight in this embodiment). An example of the way in which image data is divided into areas a1 to a4 in this case is illustrated in FIG. 15. In this case, the DC differences in the compression processing for the channels Ym3 and Ym4 can be calculated in the same way as in the embodiment. For the channel Ym1, in the case where the'current target unit is not the first unit, the difference between the DC coefficient of the channel Ym1 of the current target unit and the DC coefficient of the channel Ym2 of the immediately previous target unit can be calculated. For the channel Ym2, the difference between the DC coefficient of the channel Ym2 of the current target unit and the DC coefficient of the channel Ym1 of the current target unit can be calculated. Thus, regarding the calculation of the DC differences in the case where the image data is color as illustrated in FIG. 14, since a DC difference is calculated using the DC coefficients of two channels regardless of whether the image data is color or monochrome, the compression processing can be performed in the same way by simply changing the channel accordance with whether the image data is color or monochrome and the processing can more easily adapt to color image data and to monochrome image data.

Figure 16:
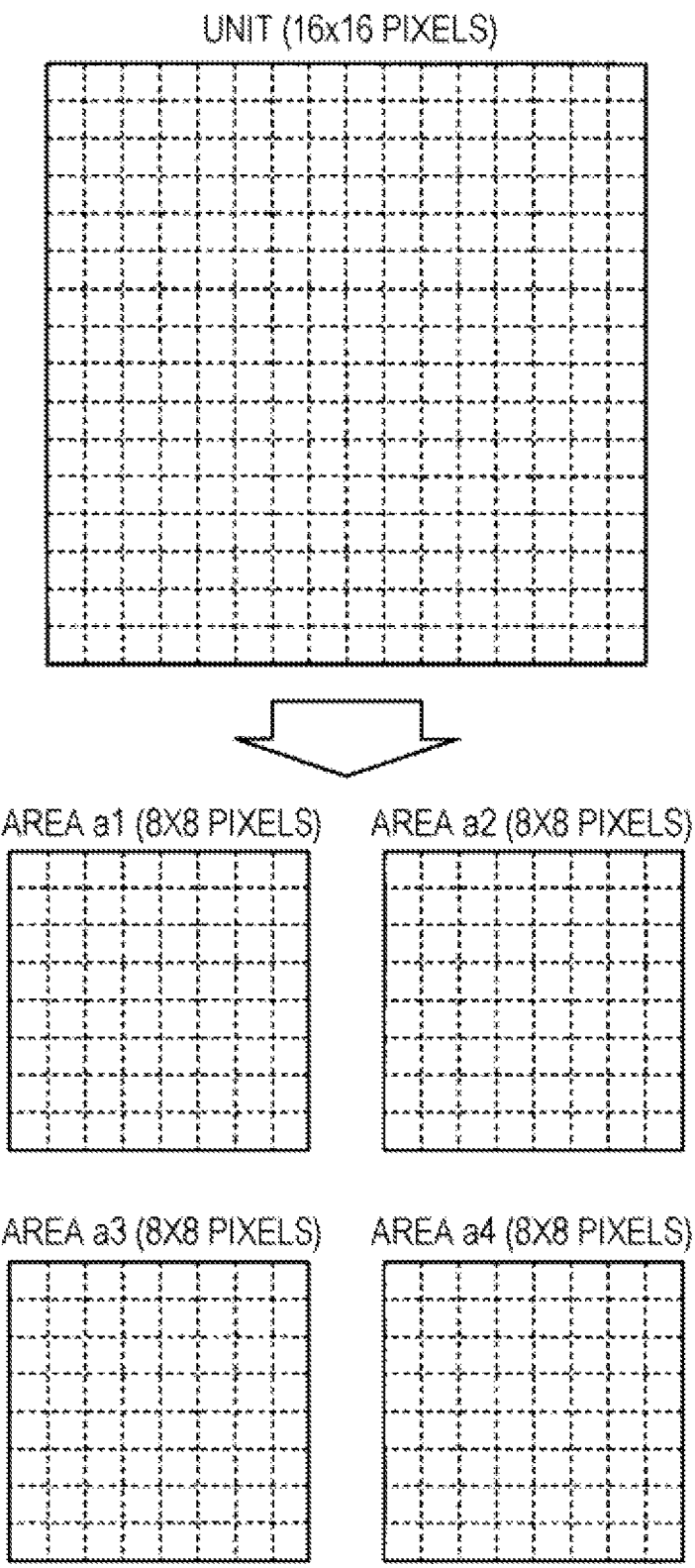
FIG. 16 is an explanatory diagram illustrating a way of dividing image data.
Figure 17:
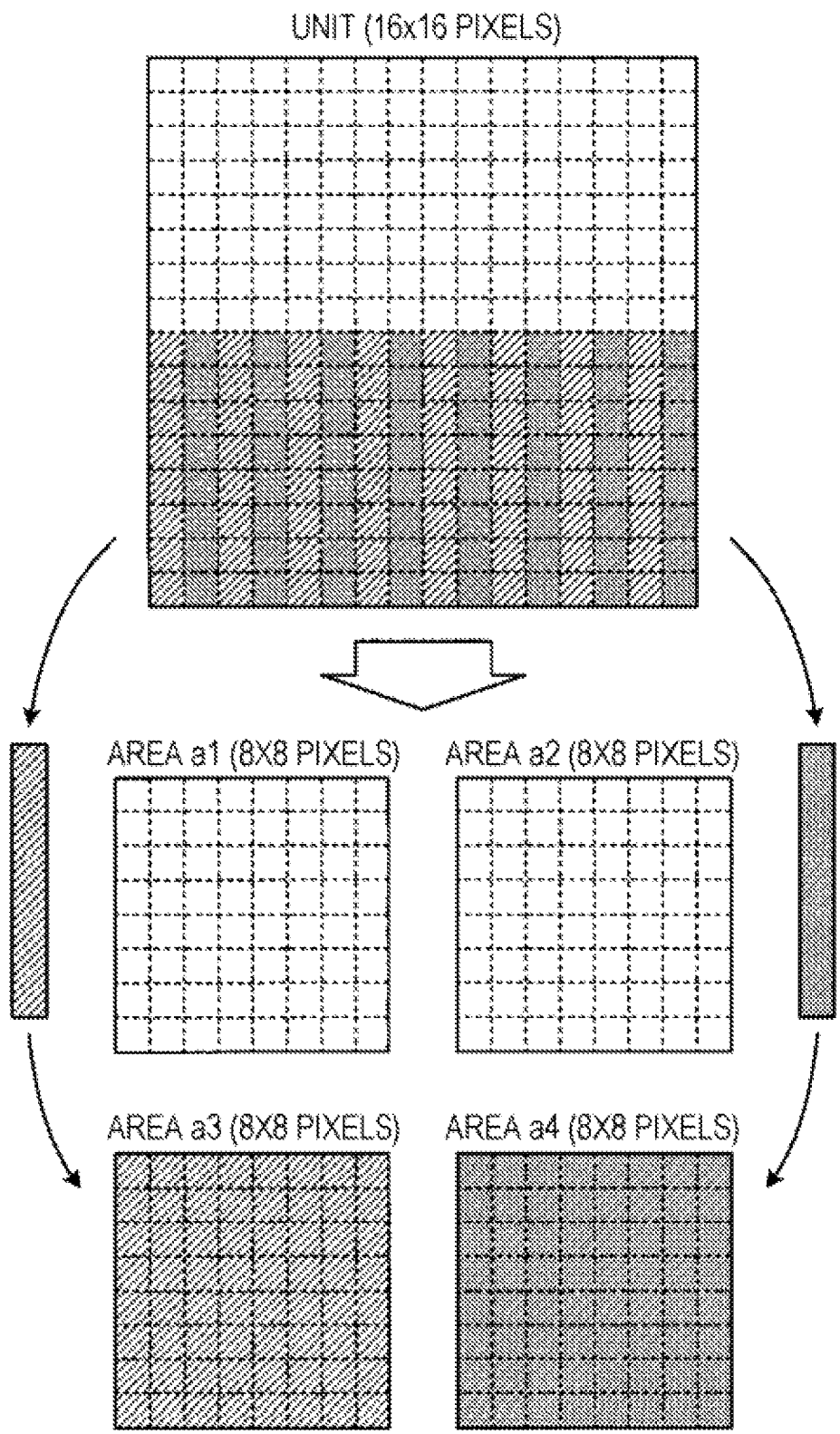
FIG. 17 is an explanatory diagram illustrating a way of dividing image data.

In the above-described embodiment, areas a1 to a4 are created by equally dividing division data containing the image data into four pieces in the horizontal direction, but not limited to this, the division data may be divided into a plurality of units and areas a1 to a4 may be created for each of the units. In this case, for example, for every unit composed of 16×16 pixels obtained by dividing the division data, as illustrated in FIG. 16, a top left area, a top right area, a bottom left area and a bottom right area obtained by dividing the unit about the center in the vertical and horizontal directions can be made to respectively be areas a1 to a4, or, as illustrated in FIG. 17, the top half of a unit can be divided about the center in the horizontal direction and a top left area and a top right area can be made to respectively be areas a1 and a2, and for the bottom half of the unit the odd-numbered columns of pixels can be combined to form an area a3 and the even-numbered columns can be combined to form an area a4.

In the above-described embodiment, for the individual pixels of the image data, when the values of R, G and B in the RGB color system are compared and R=G=B for all of the pixels, it is determined that the image data is monochrome and otherwise it is determined that the image data is color. However, not limited to this, for example, it may be determined whether or not the image data contains a black character and after suppressing the chroma component in the case where it is determined that the image data does contain a black character, or after performing black separation processing to increase the chroma component in the case where it is determined that the image data does not contain a black character, it may be determined whether the image data is color or monochrome.

In the above-described embodiment, in the case where a target block is color, channels are created in accordance with the color components of the YCbCr color system, but not limited to this channels may be created in accordance with the respective color components of another color system such as the CMYK color system.

In the above-described embodiment, in the case where the image data is color, two of each type of table, namely, a quantization table, an AC Huffman table and a DC Huffman table, are used, one being for Yc and α and one being for Cb and Cr. However, not limited to this, four of each type of table may be used, that is, one of each type for Y, for α, for Cb and for Cr, or, for one out of a quantization table, an AC Huffman table, and a DC Huffman table (for example a quantization table), four tables may be used, that is, one for Y, one, for α, one for Cb and one for Cr, and for each of the remaining types of table, a table may be used for Yc and α and a table may be used for Cb and Cr.

In the above-described embodiment, in the case where a target block is monochrome, a table group for Yc and α is used as a monochrome table group from among the color table groups (dual purpose), but a monochrome table group different from the table group for Yc and a may be used (for example, a table group that more readily retains high-frequency components compared with the table group for Yc and α).

In the above-described embodiment, when compressing the image data, discrete cosine transformation, quantization, AC Huffman compression and DC Huffman compression are performed, but not limited to AC Huffman compression and DC Huffman compression, entropy compression such as arithmetic compression may be performed.

In the above-described embodiment, the entirety of the image data corresponds to a block in an aspect of the invention, it is determined whether the image data is color or monochrome and the image data is compressed in accordance with the result of the determination. However, instead the image data may be divided into a plurality of blocks, that is, part of the image data may correspond to a block in an aspect of the invention, and it may then be determined whether each of the divided blocks is color or monochrome and compression may be performed in accordance with the results of the determinations. Here, a block for example may have a predetermined number of pixels in one of the vertical and horizontal directions (for example 8 or 16 pixels) and may be equal to the length of the image data in the other direction, or instead the image data may be divided in the vertical and horizontal directions to obtain a predetermined number of pieces (for example 2 or 4)

In the above-described embodiment, an aspect of the invention is explained by being applied to a general-purpose computer, but provided that image data compression is performed, things to which an aspect of the invention may be applied are not limited and for example an aspect of the invention may be applied to printers, scanners, digital cameras, fax machines, and mobile phones equipped with an image-processing function.

Aspects of the invention can be utilized in for example the image-processing-apparatus manufacturing industry.

What is claimed is:

1. An image processing method for compressing image data, comprising:
    (a) obtaining a block composed of part of or all of the image data:
    (b) determining whether the obtained block is color or monochrome; and
    (c) performing, in the case where the obtained block is determined to be color, compression processing in parallel for a predetermined number of elements of a predetermined color system, and performing, in the case where the Obtained block is determined to be monochrome, the compression processing in parallel for individual areas obtained by dividing a division block containing, the obtained block into a predetermined number of pieces for a single component of the predetermined color system;
    wherein, in the case where the obtained block is determined to be monochrome, in (c), the individual are set by dividing the division block into a predetermined number of areas by using different methods for one portion of and the remaining portion of the division block, and
    wherein, in the case where the obtained block is determined to be monochrome, in (c), the individual areas are set by equally dividing the one portion of the division block in the left-right direction and, for the remaining portion of the division block, the individual areas are set such that areas to be units when the compression processing is performed alternate with each other.

2. The image-processing method according to claim 1, wherein, in (c), in the case where the obtained block is determined to be color, the compression processing is performed in parallel for the predetermined number of elements in units having a first predetermined number of pixels in the vertical and horizontal directions, and in the case where the obtained block is determined to be monochrome, the compression processing is performed in parallel for the predetermined number of elements in units having a second predetermined number of pixels in the vertical and horizontal directions for each of the predetermined number of areas.

3. The image-processing method according to claim 2, wherein the block that is obtained in (a) has a size equal to a predetermined number of times or more the size of the unit having the second predetermined number of pixels in the vertical and horizontal directions.

4. A non-transitory computer readable storage medium that stores a program for causing a computer to execute each step of the image-processing method according to claim 1.

5. An image-processing method for compressing image data, comprising
    (a) obtaining a block composed of part of or all of or the image data;
    (b) determining whether the obtained block is color or monochrome: and
    (c) performing, in the case where the obtained block is determined to be color compression processing in parallel for a predetermined number of elements of a predetermined color system, and performing, in the case where the obtained block is determined to he monochrome, the compression processing parallel for individual areas obtained by dividing a division block containing the obtained block into a predetermined number of pieces for a single component of the predetermined color system;
    wherein in (c) in the case where it is determined that the obtained block is color, the compression processing is performed in parallel for four elements of the YCbCr color system and in the case where it is determined that the obtained block is monochrome, the compression processing is performed in parallel for an element for a Y component of the YCbCr color system for individual areas obtained by dividing the division block containing the obtained block into four pieces.

6. A non-transitory computer readable storage medium that stores a program for causing a computer to execute each step of the image-processing method according to claim 5.

7. An image-processing apparatus that compresses image data, comprising:
    a computer having a CPU and a memory, the computer being configured to;
    obtain a block composed of part of or all of the image data;
    determine whether the obtained block is color or monochrome;
    perform, in the case where the obtained block is determined to be color, compression processing in parallel for a predetermined number of elements of a predetermined color system, and perform, in the case where the obtained block is determined to be monochrome, the compression processing in parallel for individual areas obtained by dividing a division block containing the obtained block into a predetermined number of pieces for a single component of the predetermined color system;
    in the case where the obtained block is determined to be monochrome, set the individual areas by dividing the division block into a predetermined number of areas by using, different methods for one portion of and the remaining portion of the division block; and
    in the case where the obtained block is determined to be monochrome, set the individual areas by equally dividing the one portion of the division block in the left-right direction and, for the remaining portion of the division block, set the individual areas such that areas to be units when the compression processing is performed alternate with each other.

* * * * *